United States Patent [19]

Mueller et al.

[11] 4,145,955
[45] Mar. 27, 1979

[54] TIRE MOLD MILLING MACHINE

[75] Inventors: Horst W. Mueller, Erie, Colo.; Gill L. Yardley, North Salt Lake City, Utah

[73] Assignee: Chaparral Industries, Incorporated, Denver, Colo.

[21] Appl. No.: 760,008

[22] Filed: Jan. 17, 1977
(Under 37 CFR 1.47)

[51] Int. Cl.² ............................ B23C 3/34; B23C 3/04; B23C 3/20; B23C 1/18
[52] U.S. Cl. .................................... 90/13.7; 90/13.9; 90/DIG. 6
[58] Field of Search .................. 90/DIG. 6, 13.4, 13.7, 90/13.9

[56] References Cited

U.S. PATENT DOCUMENTS

| | | | |
|---|---|---|---|
| 1,385,333 | 7/1921 | Bush et al. | 90/DIG. 6 |
| 1,816,505 | 7/1931 | Uschmann | 90/DIG. 6 |
| 1,842,145 | 1/1932 | Breitenstein | 90/13.7 |
| 1,974,919 | 9/1934 | Harris et al. | 90/13.7 |
| 2,026,487 | 12/1935 | Williams | 90/13.7 |
| 2,050,127 | 8/1936 | Sassen | 90/13.7 |
| 2,259,472 | 10/1941 | Johnson | 90/13.7 |
| 2,407,886 | 9/1946 | Knobel | 90/13.7 X |
| 2,419,641 | 4/1947 | Hart, Jr. | 90/13.4 X |
| 2,614,464 | 10/1952 | Kiehl | 90/13.7 |

*Primary Examiner*—Horace M. Culver
*Attorney, Agent, or Firm*—John E. Reilly

[57] ABSTRACT

A machine for engraving or milling surfaces has been devised which is particularly adaptable for tire mold milling and more specifically wherein a drive spindle for a cutting tool is caused to undergo vertical or horizontal oscillation under the control of an overhead slider crank mechanism in direct correlation with the rotational movement imparted to a table support for the tire mold. The engraving tool is suspended from the work head in such a way as to be shiftable to a selected radius of curvature corresponding to the surface to be engraved, including both positive and negative radii of curvature; and is further capable of traversing either horizontal or vertical curved surfaces.

12 Claims, 8 Drawing Figures

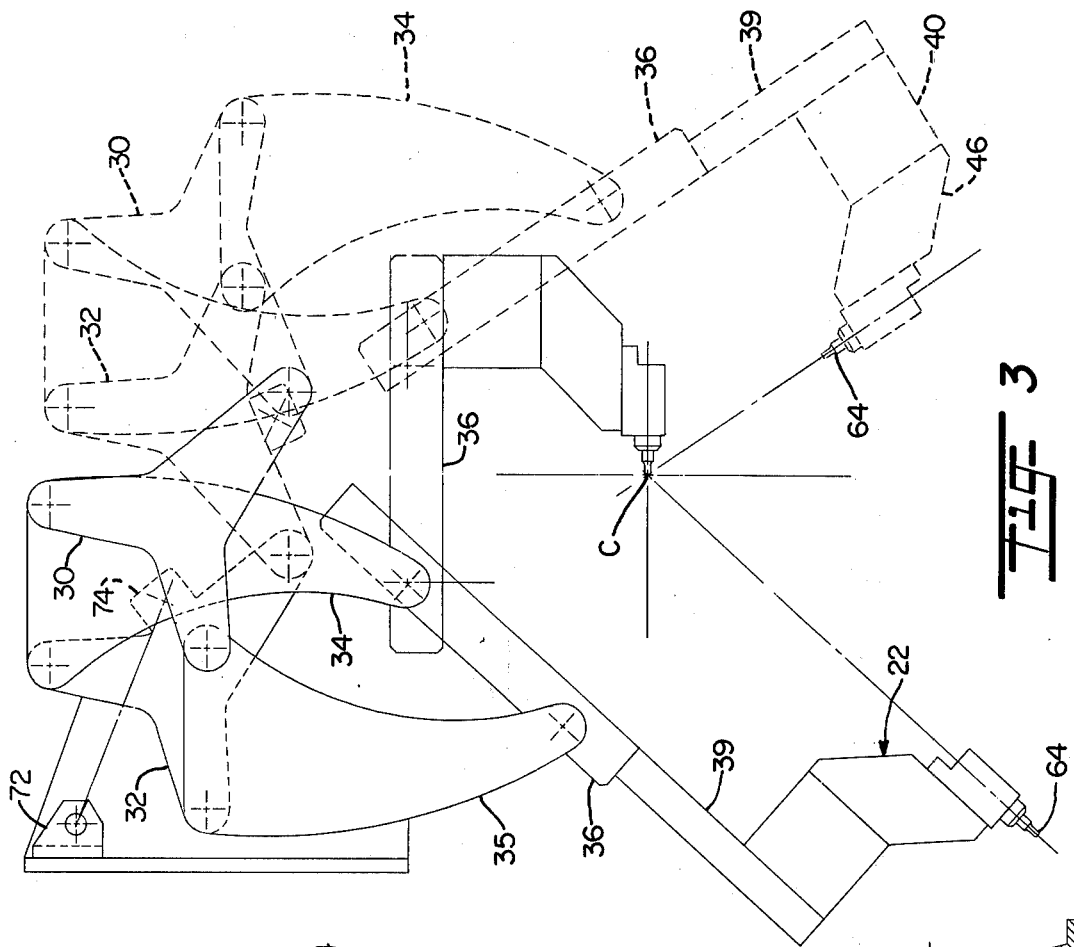
FIG. 3
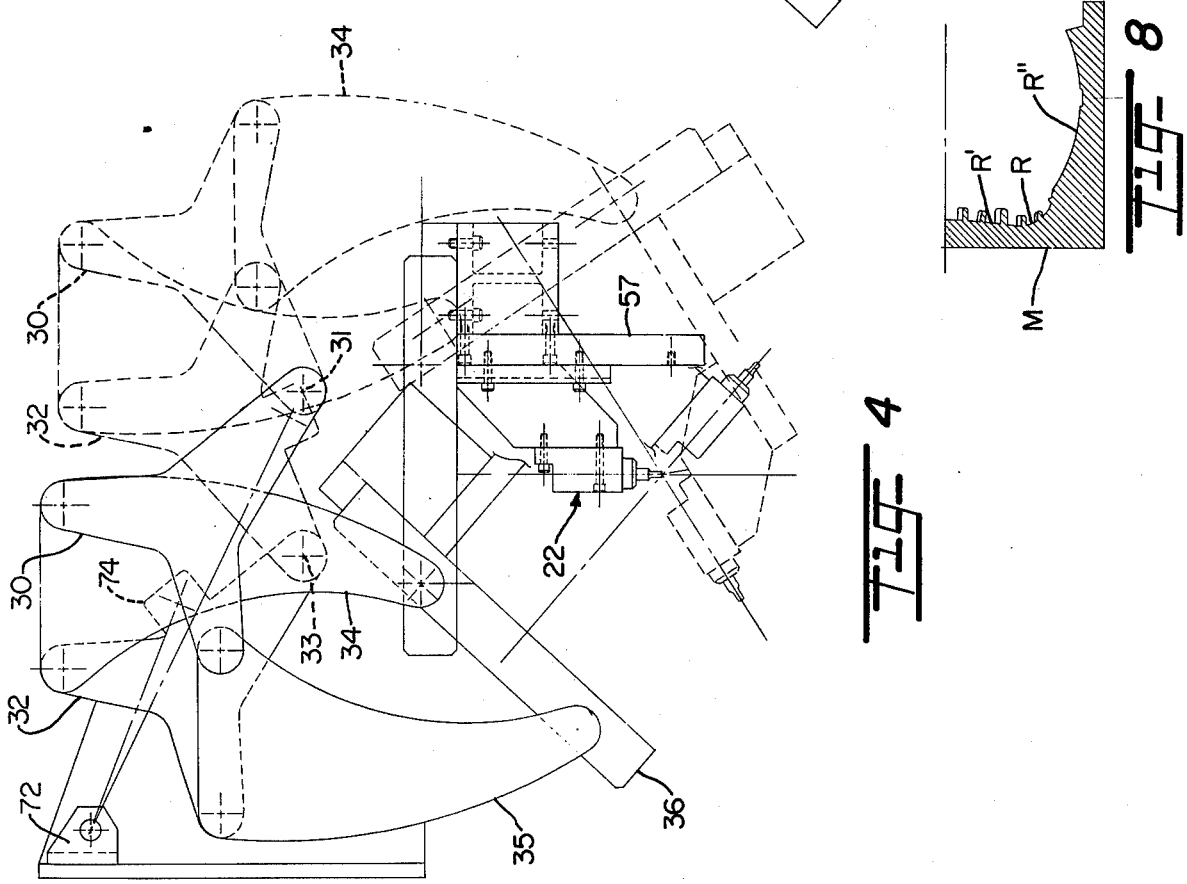
FIG. 4
FIG. 8

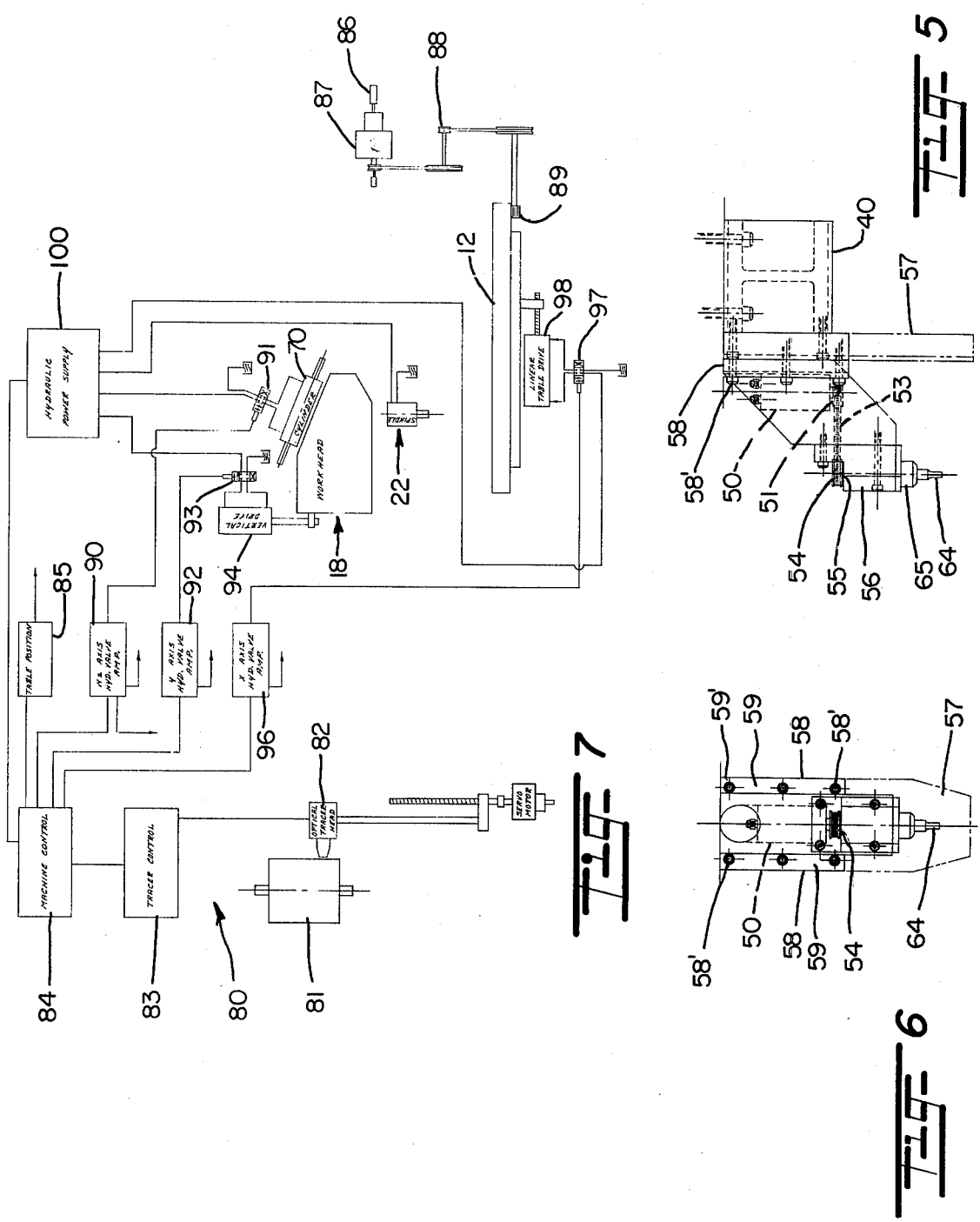

TIRE MOLD MILLING MACHINE

This invention relates to milling machines, and more particularly relates to machines of the type adapted to engrave or mill surfaces which curve in one or more directions.

BACKGROUND OF THE INVENTION

Machines have been devised for cutting and milling various shapes or patterns in metal surfaces and the like. However, the formation of tread patterns in a tire mold presents particular problems in that the mold is curved both in a circumferential direction and may have any number of patterns formed along different radii of curvature in a direction transversely of its circumference including both positive and negative radii of curvature. Yet, to be economically feasible, the milling operation is most desirably carried out at a single station or machine in which the mold can be clamped in place with a single tool holder which is caused to describe different arcs or radii of curvature automatically in response to a pattern to be traced as the mold is rotated at a predetermined but variable rate of speed in either direction of rotation. Further, it is desirable that the tool be capable of oscillation through a selected radius of curvature, positive or negative, either along a vertical or horizontal surface of the mold and in such a way as to require replacement or substitution only of the cutting tool itself to conform to various widths or thicknesses and shapes of a pattern to be formed while permitting adjustment of the radius or arc described by the tool. Further, the machine should be so designed as to be responsive to various types of pattern tracing systems and wherein the tool itself is capable of traversing different arcs in response to linear impulses or speed control signals.

SUMMARY OF THE INVENTION

It is therefore an object of the present invention to provide for a novel and improved milling or engraving machine which is particularly adaptable for use in forming patterns in surfaces which curve in one or more directions.

It is another object of the present invention to provide for a novel and improved tire mold milling machine capable of traversing different radii of curvature, both positive and negative, in a direction transversely of the circumference of the mold in forming various tread patterns therein.

It is a further object of the present invention to provide in a milling machine for a cutting tool which is operative automatically in response to pattern tracing means to describe different arcs along vertical or horizontal curved surfaces in closely coordinated relation to rotational movement of the mold.

It is a still further object of the present invention to provide in a milling machine for a work head mechanism adapted to convert linear drive signals into horizontal or vertical oscillation of a cutting tool along a curved surface in closely coordinated relation to rotation of that surface whereby to accurately reproduce a pattern to be traced in a rapid but accurate and dependable manner.

It is a still further and additional object of the present invention to provide in milling machines and the like for the unique combination of a slider crank mechanism and parallelogram linkage to convert linear displacement of a slide member into proportional but variable rotational displacement of a tool through either a positive or negative radius of curvature.

In accordance with the present invention, a mechanism for engraving or cutting patterns in an article having a surface which is curved in more than one direction is broadly comprised of the combination of an article support means which is adapted to rotate the article about a first axis of rotation at a predetermined rate of speed, a tool holder adapted to support the engraving or cutting tool for rotation about a second axis of rotation through the longitudinal axis of the tool, and which second axis is disposed on a radius intersecting the first axis of rotation, and oscillating means which is operative to support the tool holder for rotation or oscillation of the tool about a third axis of rotation perpendicular both to the first and second axes of rotation. Where necessary to conform to different radii of curvature on the article, the oscillating means includes means to permit adjustment or shifting of the tool holder to a position which will permit the engraving tool to describe an arc corresponding to each different radius of curvature on the surface to be engraved.

More specifically, in its application to tire mold milling operations typically the mold has an inner surface of generally toroidal configuration and is mounted both for rotation and linear movement on a horizontal table, the rotation of the tire mold being about a first vertical axis of rotation through its center. In milling tread patterns into the mold, the cutting tool is supported in a spindle assembly having a motor drive to rotate the tool about a longitudinal axis through the center of the tool, or second axis of rotation. The oscillating means is in turn defined by a vertically adjustable work head mechanism which is adapted to suspend the cutting tool in confronting relation to the surface portion to be engraved in the mold and to cause the tool to traverse different arcs of movement in accordance with different radii of curvature in the mold surface and whether along a vertical or generally horizontal surface of the mold. As the mold is rotated by the table support, the work head mechanism is automatically responsive to speed control signals generated by a pattern tracing means to control the speed and amplitude of oscillation of the cutting tool. This is achieved through the combination of a slider crank mechanism defined by spaced interconnected drive crank members which are rotatable in response to linear movement of a slide member to impart oscillatory motion to the tool holder through a parallelogram linkage so as to cause the cutting tool to describe an arc corresponding to the curvature of the surface portion to be milled or engraved. Milling or cutting of various different intricate patterns may proceed either along the vertical surface of the mold corresponding to the tread portion of the tire as well as along the horizontal surface portion corresponding to the sidewall; and the effective arc or radius of curvature of the tool may be varied simply by shifting its radius with respect to a fixed center point either to describe a positive or negative radius of curvature.

The above and other objects, advantages and features of the present invention will become more readily understood and appreciated from the following description of the preferred embodiment of the present invention when taken together with the accompanying drawings, in which:

BRIEF DESCRIPTION OF THE DRAWINGS

FIG. 1 is a side elevational view of a tire mold milling machine in accordance with a preferred form of the present invention, with portions of the machine broken away.

FIG. 2 is an end view of the embodiment shown in FIG. 1.

FIG. 3 is a side view schematically illustrating the range of movement of the engraving tool when in a horizontal oscillating position, in accordance with the present invention.

FIG. 4 is another somewhat schematic view illustrating the range of movement of the engraving tool when in the vertical oscillating position in accordance with the present invention.

FIG. 5 is a side elevational view in more detail of a preferred form of spindle assembly in accordance with the present invention.

FIG. 6 is an end view of the spindle assembly shown in FIG. 5.

FIG. 7 is a block diagram illustrating the manner in which the cutting tool is controlled by a pattern tracer; and FIG. 8 is a fragmentary cross-sectional view of a portion of a tire mold.

DETAILED DESCRIPTION OF THE PREFERRED EMBODIMENT

Figures 1, 2:
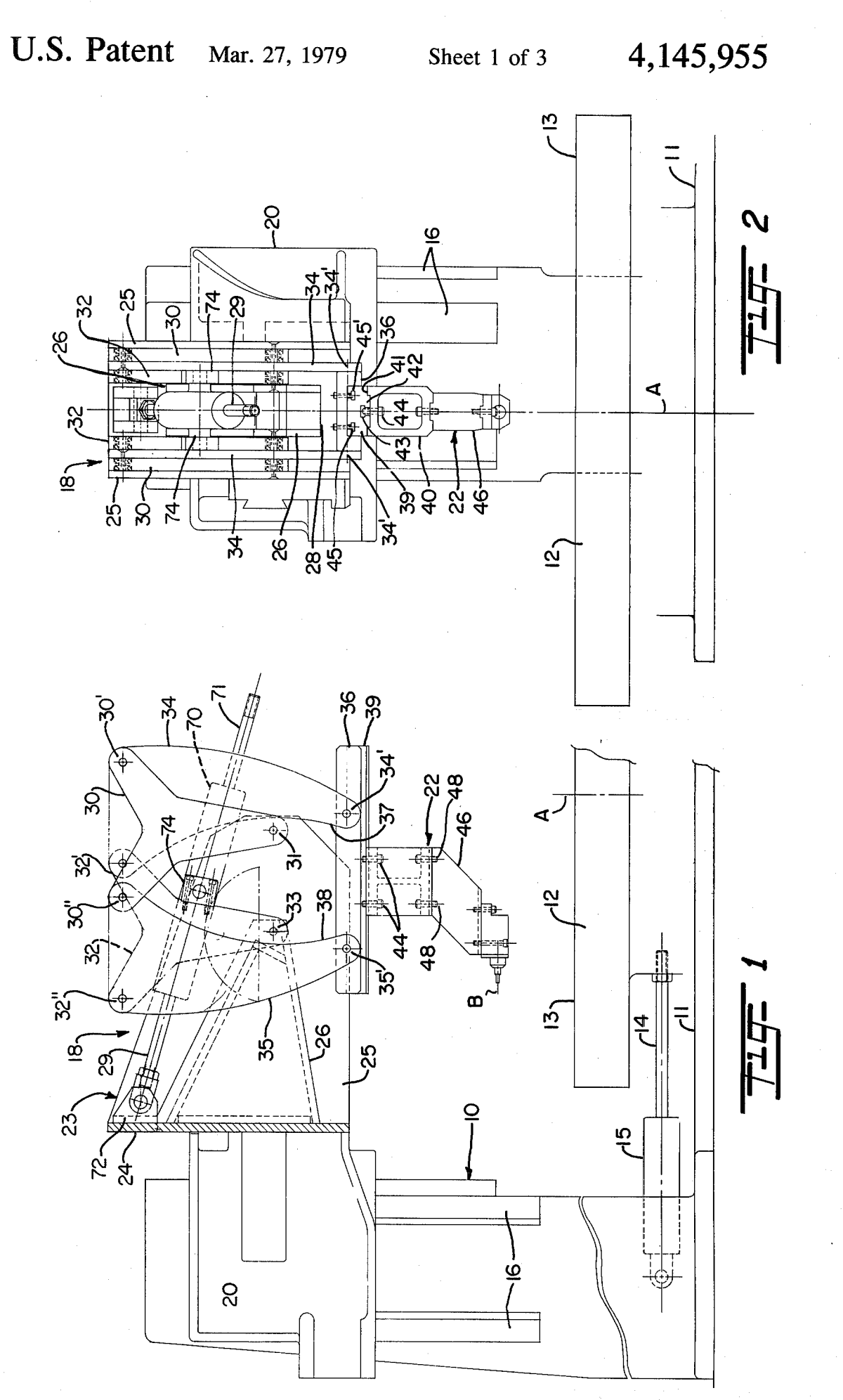

Referring in detail to the drawings, there is shown by way of illustrative example in FIGS. 1 and 2 a milling machine generally designated at 10 which in a conventional manner is provided with a horizontal carriage 11 for a table 12 which serves to support a tire mold M, shown in FIG. 8, to be engraved on the upper surface 13 of the table. A drive shaft 14 extends from cylinder 15 to impart linear movement to the table, and the table is capable of undergoing rotational movement under the control of a servomotor in a manner to be hereinafter described. The machine is provided with a vertical carriage having spaced, parallel vertical ways 16 to guide vertical movement of the work head mechanism 18 of the present invention, the work head mechanism 18 being mounted for lateral extension from a hollow casting or frame 20 which is supported for vertical movement along the vertical ways 16 suitably under the control of a hydraulic cylinder drive as hereinafter described.

At the outset, it should be emphasized that the particular form of milling machine as such forms no part of the present invention other than its utilization in supporting a tire mold or other surface to be engraved on the table 13 and to provide the necessary drive means to advance the work head mechanism 18 in a vertical direction, to rotate the table 12, or to impart linear movement to the table in establishing the necessary alignment between the mold and spindle assembly 22 which is suspended from the work head mechanism 18. For example, one suitable form of milling machine is the Bridgewater Contour Milling Machine manufactured by Bridgewater Machine Tool Co., 68 Cherry Street, Akron 8, Ohio.

An important feature of the present invention resides in the construction and arrangement of the extension of the work head mechanism 18 which includes a main outer frame 23 of generally U-shaped configuration and make up of a vertical mounting plate 24 permanently affixed to one side of the frame 20 and laterally or horizontally extending outer frame members 25 which extend from opposite vertical side edges of the plate 24. The near frame member 25 has been removed in FIG. 1 to expose an inner frame which is affixed to the mounting plate 24 on the surface of the mounting plate opposite to the frame 20 and which consists of inner side frame members 26 projecting horizontally in spaced parallel relation to one another and in inner spaced relation to the outer side frame members 25. It will be noted that the inner side frame members 26 are of generally triangular configuration and of limited length and dimension relative to the greatly increased size and length of the outer side frame members 25; and the inner frame members 26 define a common channel 28 therebetween which is aligned with and permits movement of a linear slide member 29 to be hereinafter described.

Disposed between the inner and outer side frame members 26 and 25 on either side of the common channel 28 are slider crank mechanisms, each mechanism correspondingly comprised of a pair of eccentric drive cranks of generally Y-shaped configuration, there being a forward or outer drive crank 30 having its lower end pivotally connected as at 31 to the forward extremity of the outer side frame member 25 and an inner, rearward drive crank 32 having its lower end pivotally connected as at 33 to the forward extremity of the inner side frame member 26, the points of pivotal connection 31 and 33 being in a common horizontal plane. A parallelogram linkage for each slider crank mechanism is defined by a pair of generally triangular drag links, there being a forward drag link 34 pivotally connected to the forwardly divergent arm 30' of the forward drive crank 30 and with its rearward corner pivotally connected to the forwardly divergent arm 32' of the rearward drive crank 32. A rear drag link 35 similarly has one corner pivotally connected to the rearwardly divergent arm 30" of the drive crank 30 and its rearward corner pivotally connected to the rearwardly divergent arm 32" of the rearward drive crank 32, the points of pivotal connection between the drag links and drive cranks being such as to cause the drag links to be constrained in their movement to follow rotational movement of the drive cranks 30 and 32 under the control of the linear slide member 29. In addition, a follower link is defined by an elongated common mounting block 36 which extends transversely between the lower ends of the drag links pairs 34 and 35 of the slider crank mechanisms on either side of the common channel 28, the lower end of the drag link 34 being pivotally connected at 34' to the follower link 36 and the lower end of the drag link 35 being pivotally connected as at 35' to the follower link at a point rearwardly of the pivotal connection 34 such that the drag links are constrained to move in spaced parallel relation to one another under the influence of the drive cranks 30 and 32.

As best seen from FIG. 2, the drag links 34 and 35 are pivotally connected to the drive cranks 30 and 32 so that the drag links are movable in a common vertical plane, each of the drag links being affixed to the inner surface of the forward drive crank 30 and to the outer surface of the rearward drive crank 32. For reasons which will become more apparent from a consideration of the extreme ranges of movement of the sliding crank mechanisms as shown in FIGS. 3 and 4, the drive cranks are of generally Y-shaped configuration while the drag links 34 and 35 have generally arcuate or concave facing surfaces 37 and 38, respectively, so as to afford sufficient clearance between them in following movement of the drive cranks.

The spindle assembly 22 includes a main body 46 which is suspended by a slide block 40 in a longitudinally adjustable plate 39 inserted in a channel on the undersurface of the follower link or block 36. The slide block 40 is of hollow generally rectangular configuration with locating ribs 41 projecting upwardly from top wall 42 and vertical openings in its top wall adapted to be aligned with a T-shaped slot 43 in the plate 39 so as to permit insertion of bolts 44 into the slot in fastening the spindle assembly to the undersurface of the support block. Similarly, the connecting bolts 45 extend downwardly from the block 36 for insertion of the enlarged heads of the bolts in T-shaped slots 45' extending longitudinally in spaced parallel relation to one another in the upper surface of plate 39.

As further shown in FIGS. 5 and 6, the spindle assembly has a main body 46 which is affixed to the bottom of the slide block by a vertical adapter plate 57. As further shown in FIGS. 5 and 6, a hydraulic motor represented at 50 is mounted in a cavity formed in the body 46 to rotate drive pulley 51 and impart rotation to a timing belt 53 which is trained over the pulley 51 and a lower driven pulley 54 at the rearward end of spindle 55. A spindle 55 is journaled in a housing 56 which forms a lateral extension from the end of the body 46 and the spindle is journaled by bearings, not shown, at the forward and rearward ends of the housing 56. A conventional form of cutting or engraving tool 64 is inserted through collets 65 which are supported in place at one end of the spindle.

The linear slide member 29 is preferably defined by a hydraulic cylinder 70 which is slidable on a piston rod 71, the latter being pivoted at the upper end of the mounting plate 24 by brackets 72 for pivotal or swinging movement in a vertical plane passing through the center line of the common or central channel 28. The cylinder is a double-acting hydraulic cylinder which is provided with a pair of pivot mounts 74 on diametrically opposite sides of the cylinder to drivingly connect the cylinder to the leg of each of the rearward drive cranks 32. In this way, linear motion imparted to the cylinder causing it to advance or retract with respect to the piston rod 71 will cause rotational movement of the drive cranks 32 about their lower pivots 33. Owing to the fact that the drag link 35 interconnects the drive crank 32 to the forward drive crank 30, the forward drive crank 30 will follow a corresponding path of movement to that of the drive crank 32, and the drag links 34 and 35 in combination with the follower links 36 form a parallelogram linkage which will cause the follower link 36 to follow an arcuate path of movement about a center point C spaced beneath the follower link along a vertical center line passing intermediately between the fixed pivot points 31 and 33 of the drive cranks. Of course the vertical spacing of the center point C beneath the follower links will be dictated by the effective turning radius of each of the drive cranks 30 and 32 and the effective lengths of the drag links 34 and 35 as well as the spacing between the drive cranks and drag links, respectively.

From the foregoing description of the mounting and disposition of the spindle assembly with respect to the follower link 36, the cutting tool on the spindle assembly is suspended a distance beneath the follower link so as to permit its alignment with the center point C, for example, when mounted on the follower link in the relationship shown in full in FIG. 3. In this position, notwithstanding rotation of the follower link 36 the tip of the cutter would of course rotate about the center point. However, by shifting or sliding the spindle assembly along the support block 36, for example, in a direction to the left as viewed in FIG. 3, it will be apparent that rotational movement of the follower link 36 will cause angular displacement of the cutting tool about the center point C and would cause it to describe a positive or convex arc.

For the purpose of illustration and not limitation, an optical line tracer 80 is provided for use in association with a bridge port milling machine, the optical line tracer for example being a Model EC951-965 manufactured by Stewart Warner Electronics of Chicago, Illinois. As a setting for the present invention, the optical line tracer 80 conventionally includes a drum 81 upon which is placed a drawing of the line or pattern to be traced and engraved upon the surface of a tire mold clamped to the upper surface of the table. An optical tracer head 82 generates speed control signals by scanning the pattern as it is rotated by the drum, and which signals are fed through a tracer control circuit 83 and a machine control circuit 84. The tracer control 83 operates essentially to feed back signals through a servo steering motor, not shown, in order to hold the position of the tracer head relative to the line or pattern being traced. In turn, the machine control circuit 84 selectively delivers under control of the operator speed control signals to one or more of the drive cylinders provided to control the table and work head mechanism. Specifically, these signals are selectively delivered to a table position readout circuit 85, a linear slide valve amplifier 90, a work head valve amplifier 92 and a linear table drive amplifier 96. Table position readout circuit 85 applies signals through a position encoder 86 to servomotor 87 which in turn controls a speed reducer unit 88 for a bevel drive gear 89 to rotate the table 12 at a predetermined rate of speed. The linear slide valve amplifier 90 applies speed control signals to flow control valve 91 for the double-acting slide cylinder 70. Similarly, the work head valve amplifier 92 applies speed control signals to the flow control valve 93 for the vertical drive cylinder 94 in order to drive the work head in a vertical direction and position it at the desired vertical spacing above the table and tire mold. Lastly the valve amplifier 96 applies signals to flow control valve 97 for double-acting cylinder 98 which horizontally positions the table.

A source of hydraulic fluid under pressure is represented at 100 to apply fluid to the flow control valves as described; namely, the flow control valve 91 for the linear slide cylinder, the valve 93 for the vertical drive cylinder and the valve 97 for the linear table drive cylinder as well as to the associated valve amplifiers or pilot controls for the respective flow control valves as described. Although not shown, manual controls are provided for selectively controlling movement of the table and work head mechanism and particularly to establish initial horizontal disposition of the table and vertical positions of the work head mechanism with respect to one another.

The optical line tracer system is capable of providing various different combinations of speed control signals to correlate the movement of the cutting tool on the spindle assembly with respect to movement of the table. In a typical operation, a tire mold M is positioned on the table with its inner cavity in upwardly facing relation and is horizontally positioned through control of the drive cylinder 98 for the linear cable drive cylinder. The work head mechanism is then vertically positioned at the desired height above the mold and the spindle assembly is adjusted by positioning of the slide block 40 with respect to its mounting plate 39 as well as the mounting plate 39 with respect to the main block 36 in order that the cutting tool is set at a radius of curvature corresponding to that to be formed on the tire mold, such as, represented at R. The components of the signals generated by the optical tracer head in following the pattern to be traced from the drawing D are correlated through the machine control circuit to cause oscillation of the cutting tool in a vertical plane as the table is rotated at a speed and direction as governed by the signals applied by the table position readout. In accordance with variations in the radius of curvature along the tread portion of the mold, the spindle assembly may be shifted correspondingly to vary its effective radius of curvature in oscillating about its center point C as milling progresses along each line or pattern to be traced across the tread surface. For instance, the radius of curvature designated at R' is a negative radius of curvature which would require shifting of the spindle assembly to a position to the right of its center point C, as illustrated by the dotted line representation of the spindle assembly in FIG. 3.

In order to trace patterns along the radius of curvature of the sidewall as represented at R'', the body 46 of the spindle assembly is removed from the underside of the slide block 40 and repositioned along the sidewall of block 40 by an adaptor plate 57 which is interconnected between the slide block 40 and housing 46, and the housing 46 is secured in place on the adaptor plate 57 by brackets 58 on opposite sides of the housing 46 which have inward projections 59 inserted in slots in the sides of the housing and bolted onto the adaptor plate as at 58'. In this way, the cutting tool is capable of horizontal oscillation about the center point C. In either position of the tool 64, as the table or article support means is caused to rotate about a first axis of rotation designated A, the cutting tool 64 is caused to rotate about a second axis of rotation designated B which is spaced above and intersects the first axis of rotation as it is simultaneously caused to oscillate or describe an arc about a third axis of rotation through center point C perpendicular to the first and second axes of rotation. As a result, the cutting tool is capable of engraving or milling a pattern into the surface of the mold notwithstanding both circumferential and transverse curvature of the mold; and further wherein the transverse curvature may be along different radii of curvature and which may require traversal both of negative or positive arcs as described. Accordingly, various intricate tread patterns may be formed by correlating both the speed and direction of table rotation with the oscillation of the cutting tool under the control of the pattern tracing means.

It is therefore to be understood that various modifications and changes may be made in the specific type of pattern tracing means employed as well as for the table support and work head mechanism support and controlling means without departing from the spirit and scope of the present invention as defined in the appended claims.

What we claim is:

1. Apparatus for engraving a pattern in an article having a surface which is curved in more than one direction comprising:

article support means including rotatable means for rotating said article about a first axis of rotation at a predetermined velocity;

tool support means for supporting an engraving tool for rotation about a second axis of rotation, said second axis of rotation disposed on a radius intersecting said first axis of rotation; and control means supporting said tool support means for rotation of said tool support means about a third axis of rotation perpendicular to said first and second axes of rotation, said control means including a slider crank mechanism and a parallelogram linkage interconnecting said slider crank mechanism and said tool support means, means for transmitting drive signals to said slider crank mechanism, said parallelogram linkage being responsive to signals applied to said slider crank mechanism to cause said tool support means to describe an arcuate path of movement about said third axis of rotation, and means for advancing said tool support means to vary the radius of curvature of said engraving tool about said third axis of rotation so as to correspond to different radii of curvature of the surface to be engraved.

2. Apparatus according to claim 1, said control means including means for providing a pattern to be engraved on the surface, and means correlating the rate of rotation of said article support about the first axis of rotation with the rotation of said engraving tool about the third axis of rotation.

3. Apparatus according to claim 1, said slider crank mechanism including a crank pair rotatable about spaced horizontal axes, said parallelogram linkage including a follower link to which said second means is connected and a pair of spaced parallel links pivotally interconnecting spaced locations on said follower link with each crank of said crank pair, each parallel link being pivotally connected to a respective crank at a point circumferentially spaced from the pivotal connection of the other respective link to each crank, and a linear slide member responsive to drive signals imparted thereto to rotate said crank pair in unison.

4. A mechanism for engraving the surface of an article wherein the surface is curved in more than one direction about different radii of curvature comprising:

article support means including rotatable means for rotating said article about a first axis of rotation at a predetermined velocity, and linear reciprocating means for reciprocating said article in a plane perpendicular to said first axis of rotation;

tool support means for supporting an engraving tool for rotation about a second axis of rotation, said second axis of rotation extending along the center line of said tool on a radius intersecting said first axis of rotation; and control means supporting said tool support means for oscillation of said tool support means about a third axis of rotation perpendicular to said first and second axes of rotation, said control means including advancing means for advancing said tool support means to vary the radius of curvature of said engraving tool about said third axis of rotation so as to correspond to the radius of curvature of the surface to be engraved, and said control means including tracing means for tracing a pattern to be engraved on the surface, a slider crank mechanism and a parallelogram linkage interconnecting said slider crank mechanism and said tool support means, means for transmitting drive signals to said slider crank mechanism, and said parallelogram linkage being responsive to signals applied to said slider crank mechanism to cause said tool support means to describe an arcuate path of movement about said third axis of rotation, and means correlating the rate of rotation of said article support means about the first axis of rotation with the rotation of said engraving tool about the third axis of rotation in response to tracing of the pattern to be engraved.

5. A mechanism according to claim 4, said slider crank mechanism including a crank pair rotatable about spaced horizontal axes, said parallelogram linkage including a follower link to which said second means is connected and a pair of spaced parallel links pivotally interconnecting spaced locations on said follower link with each crank of said crank pair, each parallel link being pivotally connected to a respective crank at a point circumferentially spaced from the pivotal connection of the other respective link to each crank, and a linear slide member responsive to drive signals imparted thereto by said pattern tracing means to rotate said crank pair in unison.

6. A mechanism according to claim 4, said fourth means being operative to advance said second support means between different selected positions so as to describe either a positive or negative radius of curvature.

7. A mechanism according to claim 6 wherein an adapter plate is insertable between said second and third means to displace said engraving tool 90° from its orientation with respect to said third means.

8. In a tire mold milling machine wherein a mold blank is provided with an inner surface of generally toroidal configuration and is mounted for rotation on a horizontal table, and pattern tracing means are provided for tracing a pattern to be formed on the inner toroidal surface of said mold by means of a cutting tool mounted for rotation about a longitudinal axis through said cutting tool, the combination therewith comprising:

an overhead tool support mechanism adapted to suspend said cutting tool in confronting relation to each surface portion to be engraved having a vertically adjustable frame including a pair of inner vertical frame members disposed in horizontally spaced relation to one another above said mold and defining a common channel between said inner frame members, and outer vertical frame members disposed in outer spaced horizontal relation to each of said inner frame members on respective sides of said inner frame members opposite to said common channel;

a linear slide member pivotally connected to said mechanism and adapted for forward extension through said common channel;

a pair of inner drive crank members each member pivotal to an inner frame on opposite sides of said channel and pivotally connected to said linear slide member so as to be rotatable in response to linear movement of said linear slide member;

a pair of outer drive crank members each pivotal to one of said outer frame members forwardly of said inner drive crank members; and a follower linkage including a pair of drag links interposed between each pair of inner and outer drive cranks on opposite sides of said frame for downward extension therefrom, the drag links of each pair being pivotally connected at their upper ends to upper free divergent ends of said drive crank member, and the lower ends of said drag links pivotally connected to axially spaced locations on said cutting tool whereby to impart rotational movement to said cutting tool through an arc corresponding to the curvature of the surface portion to be milled.

9. In a tire mold milling machine according to claim 8, said drag links of each pair being pivotally connected in a common plane in spaced parallel relation to one another for extension between said drive cranks and said cutting tool.

10. In a tire mold milling machine according to claim 9, including a follower link interpositioned between the lower ends of said drag links and said cutting tool, said follower link including a mounting block aligned with the common channel formed between said inner frame members, and a slide block from which said cutting tool is suspended including means for adjustably mounting said slide block with respect to said mounting block whereby to vary the effective radius of curvature of said cutting tool in response to rotation of said drive cranks.

11. In a tire mold milling machine according to claim 10, including a spindle assembly for driving said cutting tool, said spindle assembly being suspended from said follower link for extension of said cutting tool in a horizontal direction, and an adapter plate member attachable between said spindle assembly and said follower link to displace said cutting tool 90° for extension in a vertical direction.

12. In a tire mold milling machine according to claim 8, each of said drive cranks being of generally Y-shaped configuration, and said drag links of each pair each being of generally arcuate configuration to define concave facing surfaces therebetween and arranged in a common vertical plane between said inner and outer drive crank members.

* * * * *

UNITED STATES PATENT OFFICE
CERTIFICATE OF CORRECTION

Patent No. 4,145,955                Dated March 27, 1979

Inventor(s) Horst W. Mueller et al

It is certified that error appears in the above-identified patent and that said Letters Patent are hereby corrected as shown below:

Column 3, line 67, cancel "make" and substitute
-- made --.

Claim 2, Column 8, line 28, after "support" add
-- means --.

Signed and Sealed this

Ninth Day of October 1979

[SEAL]

Attest:

RUTH C. MASON
Attesting Officer

LUTRELLE F. PARKER
Acting Commissioner of Patents and Trademarks